US010257001B1

(12) United States Patent
Siu et al.

(10) Patent No.: US 10,257,001 B1
(45) Date of Patent: Apr. 9, 2019

(54) MULTI-MODE SWITCH INTERFACE BOARD

(71) Applicant: Juniper Networks, Inc., Sunnyvale, CA (US)

(72) Inventors: Sek Wing Siu, San Lorenzo, CA (US); Raghuraman Thirumalairajan, Pleasanton, CA (US); Vijit V. Nair, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/469,078

(22) Filed: Mar. 24, 2017

(51) Int. Cl.
*H04L 12/66* (2006.01)
*H04L 25/03* (2006.01)
*H04L 12/911* (2013.01)

(52) U.S. Cl.
CPC ........ *H04L 25/03878* (2013.01); *H04L 47/78* (2013.01)

(58) Field of Classification Search
CPC .................. H04L 25/03878; H04L 47/78
See application file for complete search history.

(56) References Cited

U.S. PATENT DOCUMENTS

| | | | |
|---|---|---|---|
| 2005/0021797 A1* | 1/2005 | Talaat | H04L 49/101 709/230 |
| 2011/0228779 A1* | 9/2011 | Goergen | H04L 49/40 370/392 |
| 2012/0106526 A1* | 5/2012 | Yousefi | H04N 7/183 370/338 |
| 2013/0077621 A1* | 3/2013 | Jacob Da Silva | H04L 45/58 370/355 |
| 2017/0012738 A1* | 1/2017 | Mantiply | H04L 1/08 |
| 2017/0104693 A1* | 4/2017 | Shinohara | H04L 49/40 |

* cited by examiner

*Primary Examiner* — Syed Haider
(74) *Attorney, Agent, or Firm* — Harrity & Harrity, LLP (57) ABSTRACT

A switch interface board may include a first serializer/deserializer to communicate with a first group of packet processing components of a first chassis via a first port. The first chassis may house the switch interface board and the first group of packet processing components. The switch interface board may include a second serializer/deserializer to communicate with a second switch interface board of the first chassis via a second port. The second switch interface board may be connected to a second group of packet processing components of the first chassis. The second group of packet processing components may be different from the first group of packet processing components. The switch interface board may include a third port to communicate with a third switch interface board of a second chassis or a switching device of a cross-connect chassis.

20 Claims, 7 Drawing Sheets

MULTI-MODE SWITCH INTERFACE BOARD

BACKGROUND

A set of network devices may perform network traffic routing for a network. For example, a particular network device housed in a chassis may include a set of switch interface boards (SIBs) that provide a switching functionality for the particular network device. The set of switch interface boards may be configured in the particular network device to provide a switching fabric for the particular network device. A switching fabric may include a network topology of network nodes interconnected via the set of switch interface boards. The set of switch interface boards may be installed to operate in a particular configuration, such as a first operation mode for intra-chassis routing or a second operation mode for inter-chassis routing. To perform inter-chassis routing, the switch interface board may transmit network traffic to a cross-connect chassis, which is connected to multiple other chassis, for further routing.

SUMMARY

According to some possible implementations, a switch interface board may include a first serializer/deserializer to communicate with a first group of packet processing components of a first chassis via a first port. The first chassis may house the switch interface board and the first group of packet processing components. The switch interface board may include a second serializer/deserializer to communicate with a second switch interface board of the first chassis via a second port. The second switch interface board may be connected to a second group of packet processing components of the first chassis. The second group of packet processing components may be different from the first group of packet processing components. The switch interface board may include a third port to communicate with a third switch interface board of a second chassis, where the second chassis may be different from the first chassis, or a switching device of a cross-connect chassis, where the switching device may be to direct network traffic between the first chassis and a set of other chassis.

According to some possible implementations, a network device may include a set of switching elements. The network device may include one or more processors to configure the set of switching elements for a particular mode of a set of available modes. The set of available modes may include a standalone mode to route network traffic between a first group of packet processing components and a second group of packet processing components within a first chassis. The first chassis may house the set of switching elements. The set of available modes may include a back-to-back mode to route network traffic between the first group of packet processing components of the first chassis and a third group of packet processing components of a second chassis. The second chassis may be different from the first chassis. The set of available modes may include a multi-chassis mode to route network traffic between the first group of packet processing components of the first chassis and a cross-connect chassis. The cross-connect chassis may be different from the first chassis and the second chassis. The cross-connect chassis may be associated with directing network traffic between the first chassis and a group of third chassis. The one or more processors may receive network traffic for routing after configuring the set of switching elements. The one or more processors may route the network traffic based on configuring the set of switching elements.

According to some possible implementations, a method may include configuring, by a device, a set of switching elements of a particular plane of a first chassis for a particular mode of a set of available modes. The set of available modes may include a first mode to route network traffic between a first group of packet processing components and a second group of packet processing components within the first chassis. The first chassis may house the set of switching elements. The set of available modes may include a second mode to route network traffic between the first group of packet processing components of the first chassis and a third group of packet processing components of a second chassis. The second chassis may be different from the first chassis. The set of available modes may include a third mode to route network traffic between the first group of packet processing components of the first chassis and a cross-connect chassis. The cross-connect chassis may be different from the first chassis and the second chassis. The cross-connect chassis may be associated with directing network traffic between the first chassis and a group of third chassis. The method may include receiving, by the device, network traffic for routing after configuring the set of switching elements. The method may include routing, by the device, the network traffic based on configuring the set of switching elements.

DETAILED DESCRIPTION

The following detailed description of example implementations refers to the accompanying drawings. The same reference numbers in different drawings may identify the same or similar elements.

A network operator may utilize a set of network devices to perform switching and routing for a network. The set of network devices may be included in a chassis. For example, a particular chassis may include a switch interface board associated with a set of switching elements to perform switching for the chassis. A switch interface board associated with a standalone mode may be associated with a set of switching elements designed for the standalone mode (e.g., designed with a set of ports and/or interconnects associated with routing for the standalone mode). The standalone mode may refer to a mode where a first switching element is connected to a second switching element within the same chassis to permit packet processing components of the chassis to communicate. However, as an amount of network traffic that is to be routed for the network increases, a single chassis may lack physical space to accommodate increased quantities of switch interface boards to route the increased amount of network traffic.

Thus, a network operator may deploy multiple chassis to perform switching for the network. The multiple chassis may include multiple switch interface boards associated with multiple sets of switching elements to perform switching for the multiple chassis. In this case, a different set of switch interface boards may be installed in the multiple chassis to configure the multiple chassis for a multi-chassis mode, such as a set of switch interface boards associated with switching elements including a set of ports and/or interconnects associated with routing for the multi-chassis mode. The multi-chassis mode may refer to a mode where a first switching element of a particular chassis provides network traffic to a cross-connect chassis, which provides the network traffic to a switching element of another chassis of a group of other chassis.

When the network operator is to switch from a single chassis deployment using a standalone mode to a multi-chassis deployment using a multi-chassis mode, the network operator may replace switch interface boards of each chassis. For example, the network operator may remove switch interface boards associated with the standalone mode from a chassis and install different switch interface boards associated with the multi-chassis mode into the chassis to permit the chassis to switch from the standalone mode to the multi-chassis mode. Moreover, the network operator may install another chassis and/or reconfigure another chassis as a cross-connect chassis when switching from the single chassis deployment to the multi-chassis deployment.

However, replacing switch interface boards in a chassis may be time-consuming, error-prone, and costly. Moreover, some chassis may be located in hard to service locations, such as in a location a threshold distance from the network operator, a location that is owned by a third party, or the like. Implementations, described herein, may provide a switch interface board associated with switching elements that may be used for multiple modes, such as a standalone mode or a multi-chassis mode. In this way, implementations, described herein, permit switch interface boards to be reconfigured on demand, which improves functionality and operability of the switch interface boards. In this way, a cost and effort of reconfiguring a network is reduced and/or an accuracy of reconfiguring the network is improved relative to utilizing different switch interface boards for different deployments. Moreover, the switch interface board may enable a back-to-back mode for multiple chassis, thereby eliminating a need for a cross-connect chassis and enabling increased capacity associated with a multi-chassis mode, with reduced cost, increased accuracy, and reduced effort relative to installing a cross-connect chassis for the multi-chassis mode. Furthermore, based on obviating a need for the cross-connect chassis may improve network performance, such as by reducing latency, a rate of packet errors, or the like relative to using the cross-connect chassis.

Figure 1A:
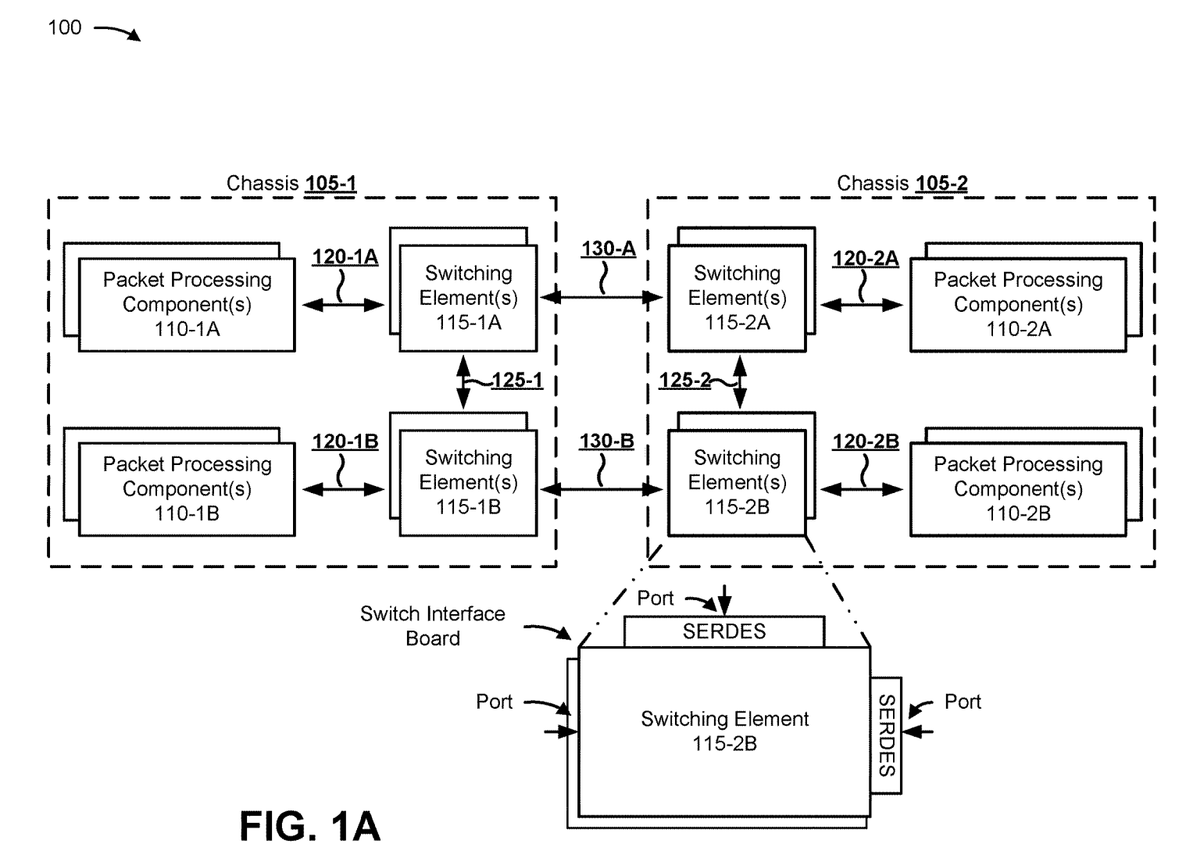
FIGS. 1A-1D are diagrams of an overview of an example implementation described herein.

FIGS. 1A-1D are diagrams of an example implementation 100 described herein. As shown in FIG. 1A, example implementation 100 includes a set of chassis 105 (shown as chassis 105-1 and 105-2). Each chassis 105 may include a set of packet processing components 110 (shown as packet processing components 110-1A, 110-1B, 110-2A, and 110-2B) and a set of switching elements 115 (shown as switching elements 115-1A, 115-1B, 115-2A, and 115-2B). For example, chassis 105-1 may include a first group of packet processing components 110-1A associated with a first group of switching elements 115-1A, and may include a second group of packet processing components 110-1B associated with a second group of switching elements 115-1B.

In some implementations, a chassis 105 may be associated with multiple planes of packet processing components 110 and switching elements 115. For example, chassis 105-1 may include a first group of packet processing components 110-1A associated with a first group of switching elements 115-1A and a first group of packet processing components 110-1B associated with a first group of switching elements 115-1B for a first plane of routing. In this case, chassis 105-1 may include a second group of packet processing components 110-1A associated with a second group of switching elements 115-1A and a second group of packet processing components 110-1B associated with a second group of switching elements 115-1B for a second plane of routing. In this way, chassis 105-1 may route network traffic with increased capacity and/or improved redundancy relative to utilizing a single plane of routing.

Packet processing components 110 may connect to switching elements 115 via respective fabric interconnects 120 (shown as 120-1A, 120-1B, 120-2A, and 120-2B). For example, packet processing component 110-1A may connect to switching element 115-1A via fabric interconnect 120-1A. Similarly, packet processing component 110-2B may connect to switching element 115-2B via fabric interconnect 120-2B. In this case, packet processing component 110-2B may provide network traffic (e.g., a set of packets) to a switch interface board including switching element 115-2B for routing, and the network traffic may be received at a first port of the switch interface board associated with a first serializer/deserializer (SERDES). Additionally, or alternatively, switching element 115-2B may provide network traffic from the first port associated with the first SERDES to packet processing component 110-2B for processing. Packet processing components 110 may include one or more components of chassis 105-1 (e.g., a router, a switch, etc.) to process a packet, such as by performing layer 2 (L2) processing, layer 3 (L3) processing, L2 or L3 encapsulation and/or de-encapsulation, division of packets, reassembly of packets, packet queuing, packet buffering, or the like.

Switching elements 115 (e.g., associated with a set of switch interface boards) within a particular chassis 105 may connect via local interconnects 125 (shown as 125-1 and 125-2) via a first set of ports of switching elements 115 (not shown). For example, switching element 115-2B may provide network traffic from a second port associated with a second SERDES to switching element 115-2A via local interconnect 125-2. Similarly, switching element 115-2B may receive network traffic at the second port associated with the second SERDES of switching element 115-2B from switching element 115-2A.

Switching elements 115 of a first chassis 105 may connect with switching elements of a second chassis 105 via inter-chassis interconnects 130 (shown as 130-A and 130-B). For example, switching element 115-2B may communicate with switching element 115-1B via inter-chassis interconnect 130-B. In this case, switching element 115-2B may communicate via inter-chassis interconnect 130-B using a third port.

Figure 1B:
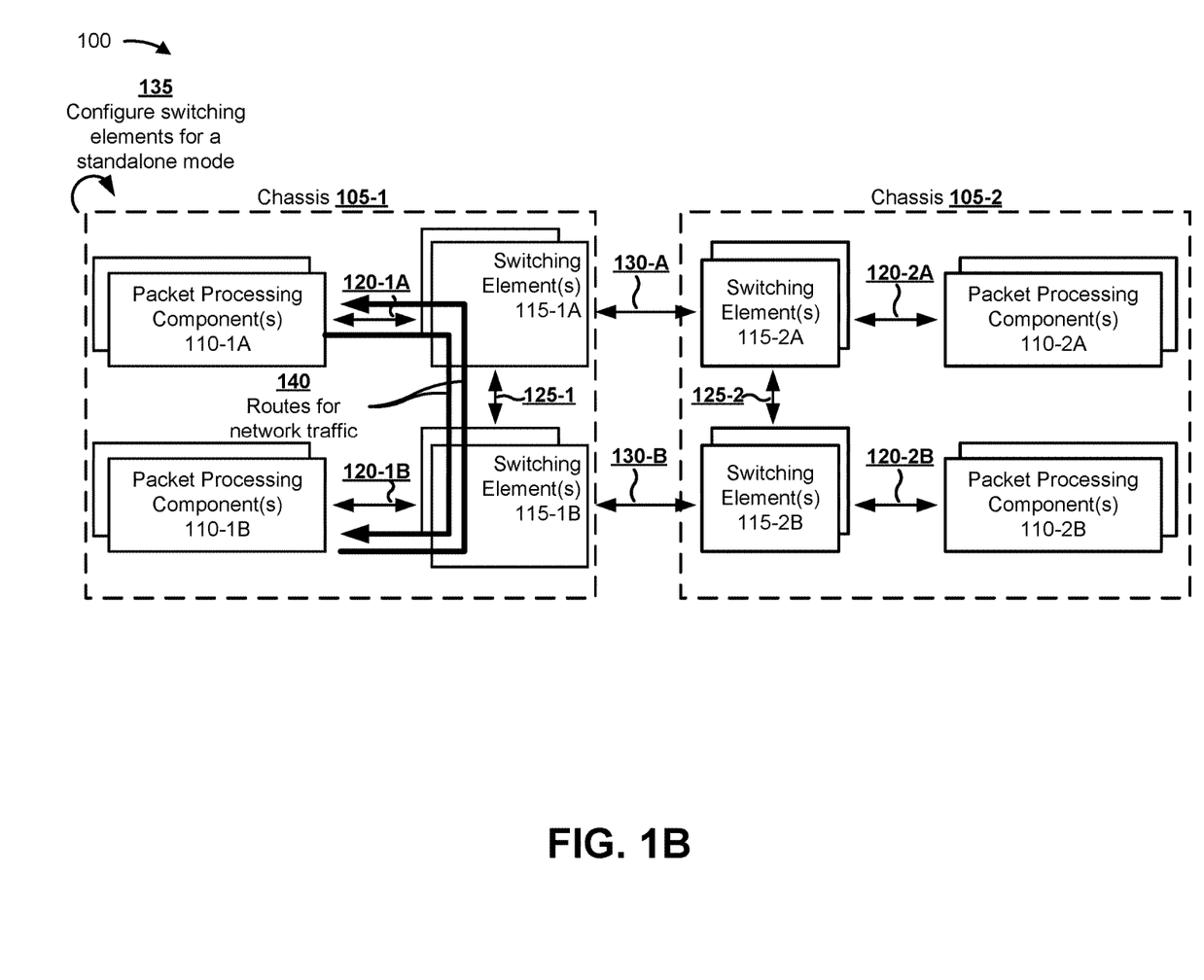

As shown in FIG. 1B, and by reference number 135, chassis 105-1 may configure switching elements 115 to operate in a standalone mode. For example, a controller (e.g., an internal controller, an external controller, etc.) of chassis 105-1 may transmit an instruction to switching elements 115 to automatically cause switching elements 115 to operate in the standalone mode (e.g., a first mode of a set of modes). Additionally, or alternatively, each switching element 115 may be configured, such as based on an instruction from a control device external to chassis 105-1 and used by a network operator, to operate in the standalone mode. As shown by reference number 140, when operating in the standalone mode, switching elements 115-1A and 115-1B, for example, permit communication between a first group of packet processing components 110-1A and a second group of packet processing components 110-1B. For example, switching element 115-1A may communicate with a first packet processing component 110 of the first group of packet processing components 110-1A via a first SERDES and a first port and fabric interconnect 120-1A, and may communicate with a second packet processing component 110 of the second group of packet processing components 110-1B via a second SERDES and a second port, local interconnect 125-1, switching element 115-1B, and fabric interconnect 120-1B. Based on using local interconnect 125-1 to permit communication between packet processing components 110-1A and packet processing components 110-1B, switching elements 115-1A and 115-1B improve capacity of chassis 105-1 relative to another technique where each packet processing component is directly connected to each switching element.

Figure 1C:
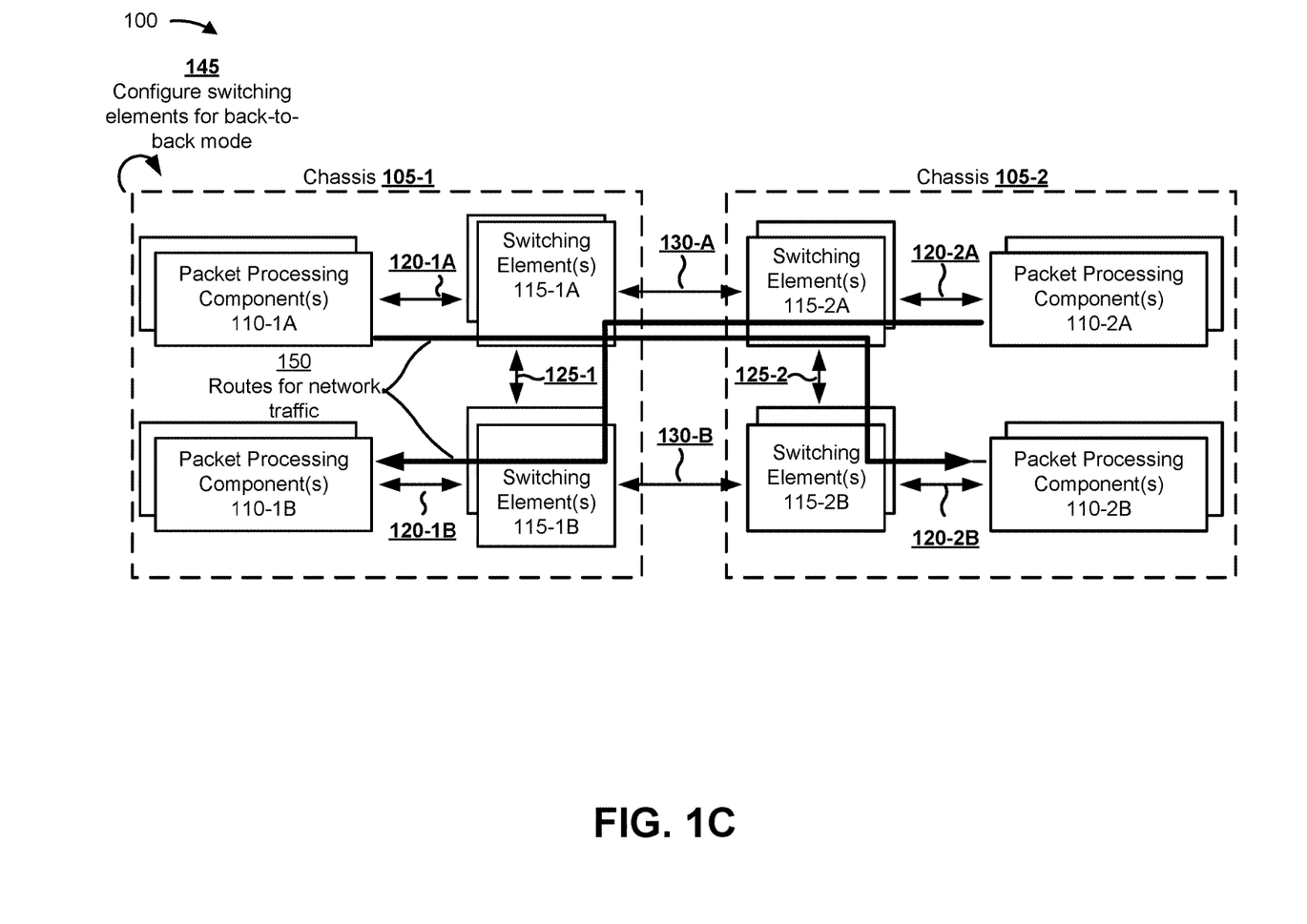

As shown in FIG. 1C, and by reference number 145, chassis 105-1 may configure switching elements 115 to operate in a back-to-back mode. For example, a controller of chassis 105-1 may transmit an instruction to switching elements 115 to automatically cause switching elements 115 to operate in the back-to-back mode (e.g., a second mode of a set of modes). As shown by reference number 150, when operating in the back-to-back mode, switching elements 115 permit communication between packet processing components 110 of each chassis 105. For example, switching element 115-1A may receive network traffic from packet processing component 110-1A via fabric interconnect 120-1A, and may provide the network traffic to switching element 115-2A via inter-chassis interconnect 130-A. In this case, switching element 115-2A may provide the network traffic to switching element 115-2B via local interconnect 125-2, and switching element 115-2B may provide the network traffic to packet processing component 110-2B via fabric interconnect 120-2B. Additionally, or alternatively, switching element 115-2A may receive network traffic from packet processing component 110-2A via fabric interconnect 120-2A, and may provide the network traffic to switching element 115-1A via inter-chassis interconnect 130-A. In this case, switching element 115-1A may provide the network traffic via local interconnect 125-1 to switching element 115-1B, and switching element 115-1B may provide the network traffic to packet processing component 110-1B via fabric interconnect 120-1B.

In this way, switching elements 115 enable two chassis 105 to operate in a back-to-back mode, thereby expanding capacity relative to another technique that uses a single chassis. Moreover, switching elements 115 permit a single chassis 105 to switch from a standalone mode to the back-to-back mode without replacing switching elements 115, thereby reducing a cost and/or a time required to expand capacity of a network. Furthermore, based on permitting two chassis 105 to connect in the back-to-back mode to expand capacity, switching elements 115 reduce a cost associated with installing a cross-connect chassis to enable a multi-chassis mode. Moreover, based on obviating a need for a cross-connect chassis, a likelihood of routing errors, bit errors, packet errors, or the like may be reduced relative to another technique that uses the cross-connect chassis.

Although described, herein, in terms of a particular set of routes, the back-to-back mode may enable other routes, such as a route for communication between packet processing component 110-1A and packet processing component 110-2A, a route for communication between packet processing component 110-1B and packet processing component 110-2B, a route for directing network traffic from packet processing component 110-1B to packet processing component 110-2A, a route for directing network traffic from packet processing component 110-2B to packet processing component 110-1A, or the like.

Figure 1D:
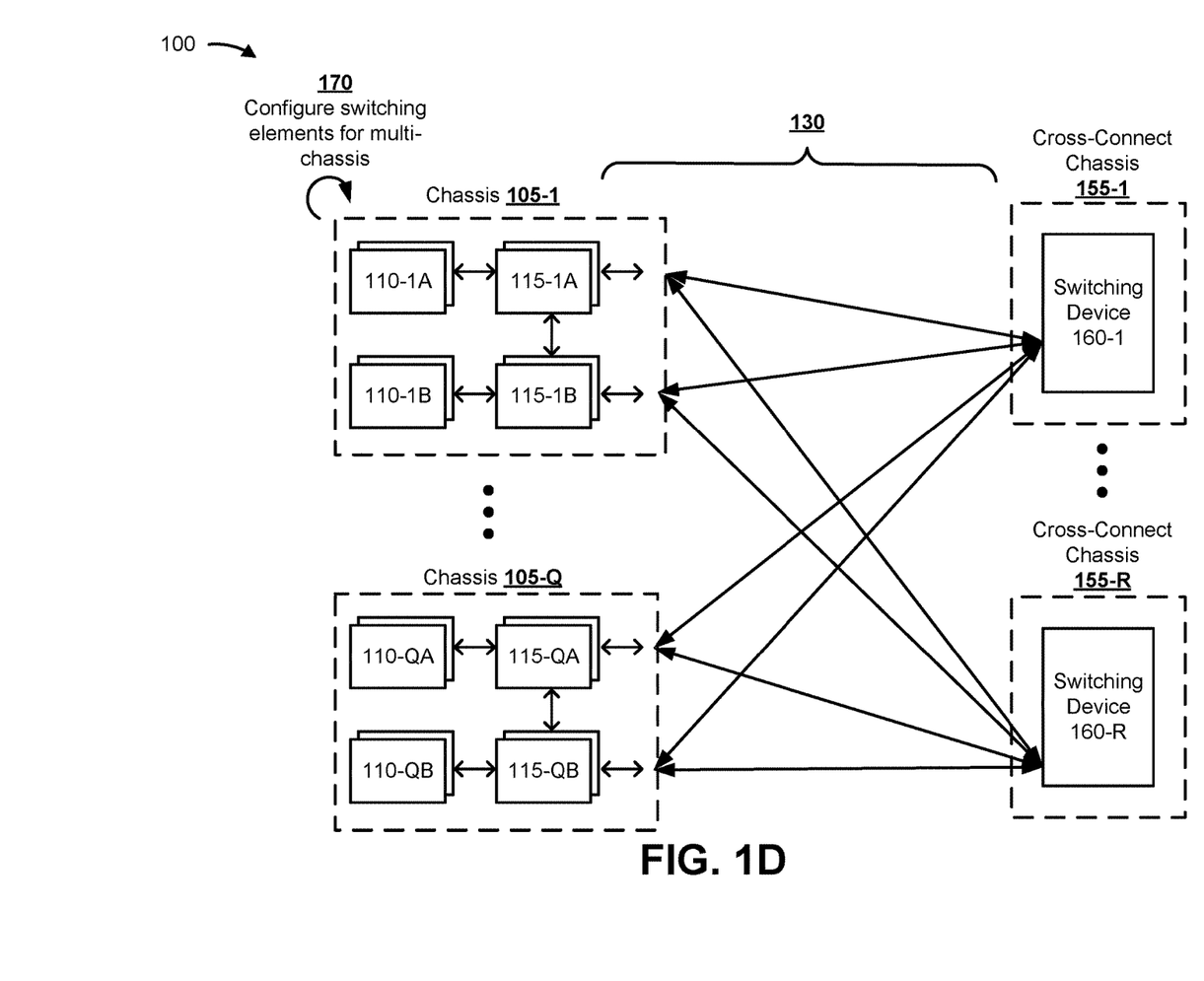

As shown in FIG. 1D, and by reference number 170, chassis 105-1 may configure switching elements 115 for a multi-chassis mode to expand capacity of network traffic routing. For example, a controller of chassis 105-1 (e.g., an internal controller, an external controller, etc.) may transmit an instruction to switching elements 115 to automatically cause switching elements 115 to operate in the multi-chassis mode (e.g., a third mode of a set of modes). In the multi-chassis mode, network traffic is routed by a switching element 115 between a corresponding group of packet processing components 110 and a cross connect chassis 155 (e.g., another chassis 105, another type of chassis, or the like) that includes a switching device 160 (e.g., another switching element 115, another type of switch, or the like). For example, switching element 115-1A may receive network traffic from packet processing component 110-1A, and may provide the network traffic to switching device 160-1 via an inter-chassis interconnect 130. In this case, switching device 160-1 may provide the network traffic to, for example, switching element 115-NB, which may provide the network traffic to a corresponding group of packet processing components 110-NB. In this way, switching elements 115 enable a transfer from a single chassis 105 with switching elements 115 operating in a standalone mode or a pair of chassis 105 with respective switching elements 115 operating in a back-to-back mode to three or more chassis 105 operating in a multi-chassis mode, thereby expanding network traffic routing capacity without replacing switching elements 115.

In this way, a switching element 115 (e.g., a switch interface board) that is associated with a first SERDES and a first port with a fabric interconnect 120, a second SERDES and a second port with a local interconnect 125, and a third port with an inter-chassis interconnect 130 may enable the switching element 115 to be configured in and/or to switch dynamically between a standalone mode, a back-to-back mode, and a multi-chassis mode based on configuration information, rather than requiring different switch interface boards and associated switching elements for each mode.

As indicated above, FIG. 1 is provided merely as an example. Other examples are possible and may differ from what was described with regard to FIG. 1.

Figure 2:
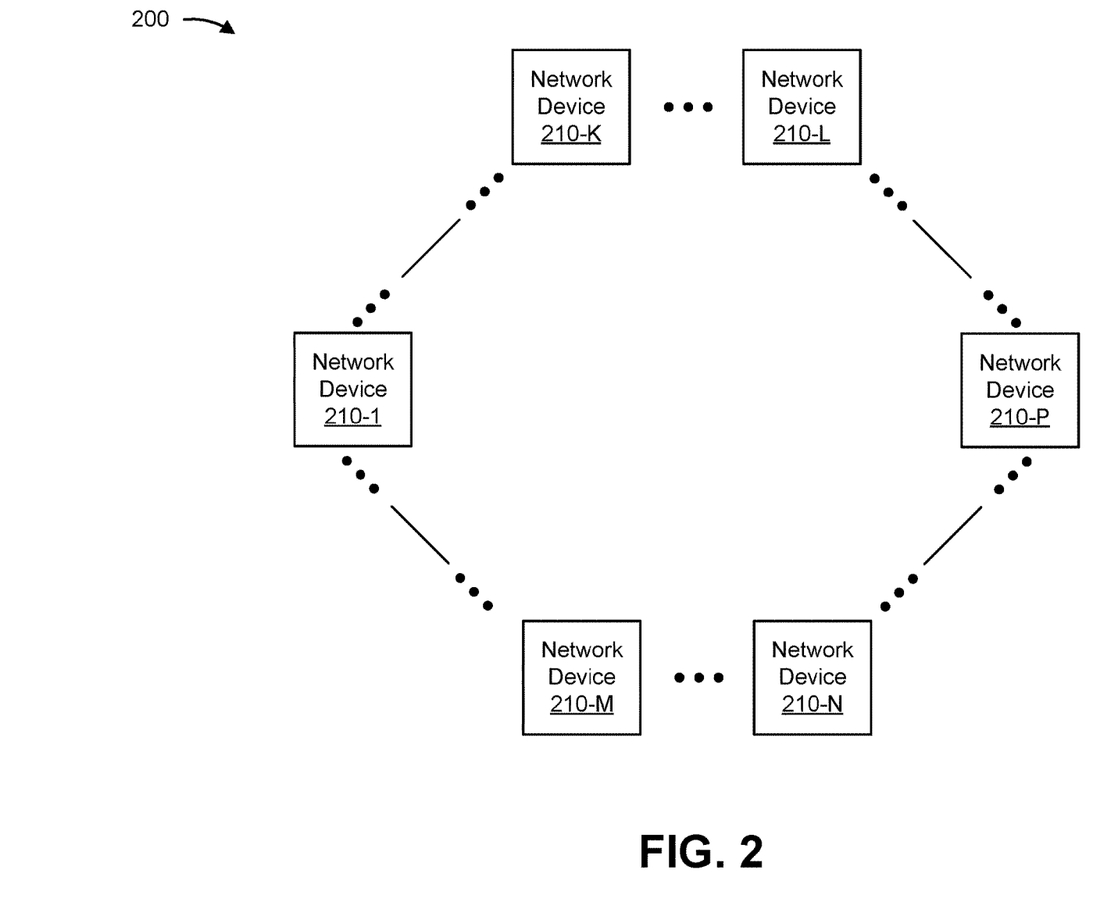
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-P (P≥1) (hereinafter referred to collectively as "network devices 210," and individually as "network device 210") and one or more networks. Devices of environment 200 may interconnect via wired connections, wireless connections, or a combination of wired and wireless connections.

Network device 210 includes one or more devices (e.g., one or more traffic transfer devices) capable of processing and/or transferring traffic between endpoint devices. For example, network device 210 may include a firewall, a router, a gateway, a switch device, a hub, a bridge, a reverse proxy, a server (e.g., a proxy server), a ToR switch, a load balancer, a switch interface board, a controller, a switching element, a packet processing component, or a similar device. In some implementations, network device 210 may include a traffic transfer device associated with providing and/or receiving information. In some implementations, network device 210 may include a host device associated with providing network traffic to and/or receiving network traffic from a network that includes a set of network devices 210. For example, network device 210 may include a server, a data storage device, a bare-metal device, or the like. In some implementations, network device 210 may be housed in a chassis, such as a router chassis that includes multiple network devices 210. In some implementations, network device 210 may be a fabric line card of a switching fabric. In some implementations, network device 210 may correspond to packet processing components 110, switching elements 115, and/or switching devices 160 as shown in FIGS. 1A-1D.

Network device 210 may be associated with one or more networks, in some implementations. Similarly, a network, of the one or more networks, may include one or more network devices 210. In some implementations, the one or more networks may include a cellular network (e.g., a long-term evolution (LTE) network, a 3G network, a code division multiple access (CDMA) network, a 4G network, a 5G network, etc.), a public land mobile network (PLMN), a local area network (LAN), a wide area network (WAN), a metropolitan area network (MAN), a telephone network (e.g., the Public Switched Telephone Network (PSTN)), a private network, a cloud-based computing network, an ad hoc network, an intranet, the Internet, a fiber optic-based network, a cloud computing network, a virtual private network (VPN), a subnet network (e.g., a subnet), and/or a combination of these or other types of networks.

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
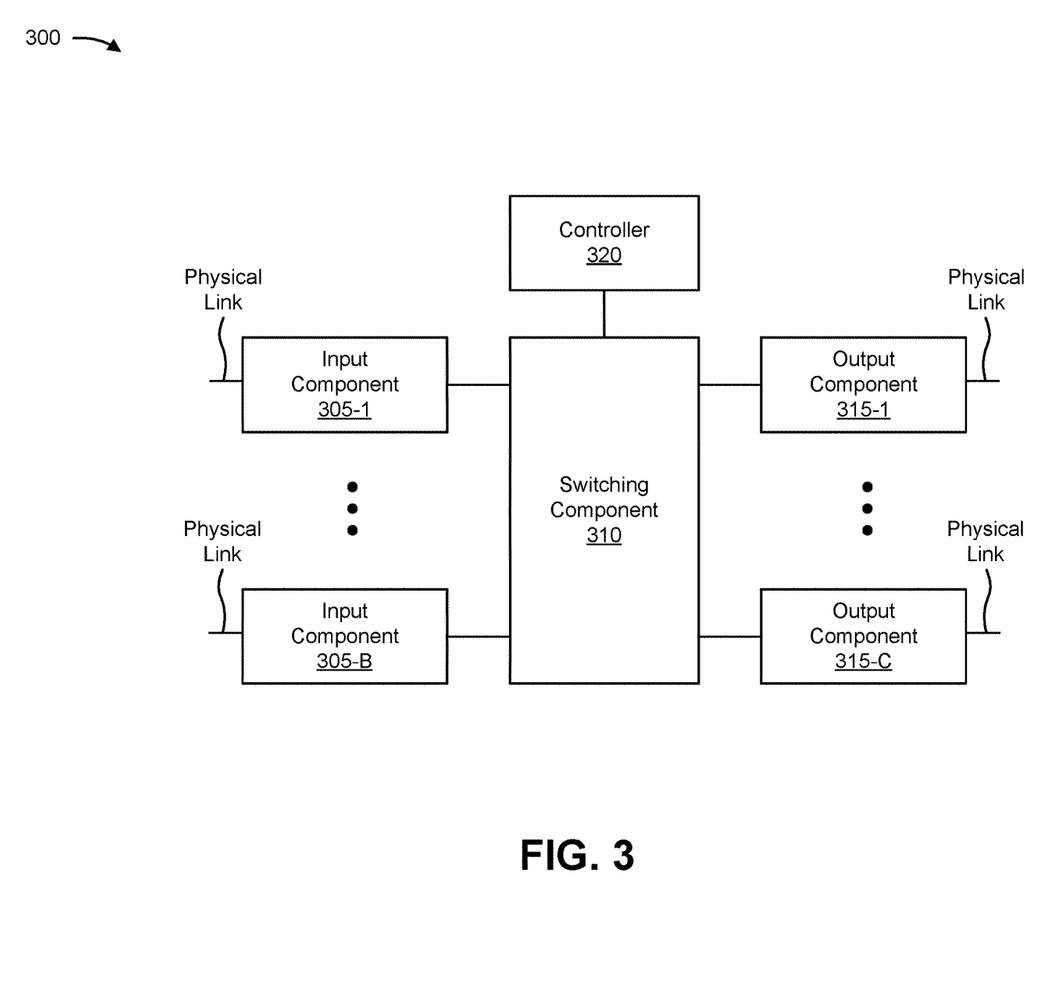
FIG. 3 is a diagram of example components of one or more devices of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305. In some implementations, input component 305 corresponds to packet processing components 110 shown in FIGS. 1A-1D.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate. In some implementations, switching component 305 corresponds to switching elements 115 shown in FIGS. 1A-1D.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315). In some implementations, output component 315 corresponds to packet processing components 110 shown in FIGS. 1A-1D.

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor that can interpret and/or execute instructions. A processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
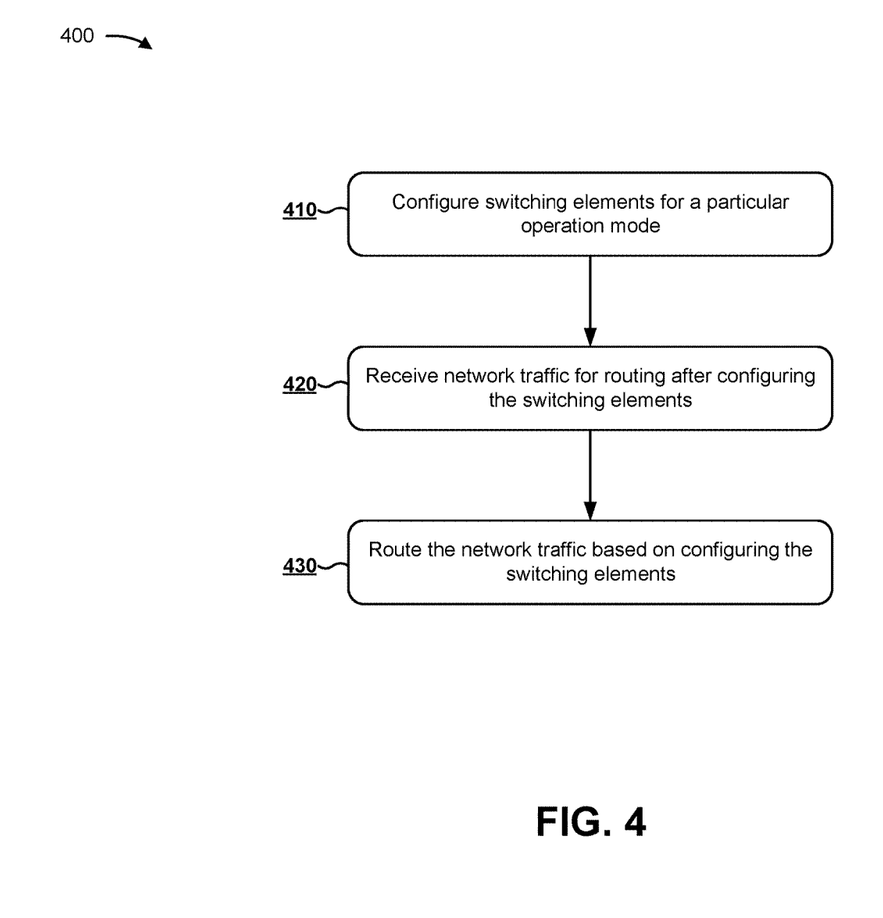
FIG. 4 is a flow chart of an example process for routing network traffic using a switch interface board.

FIG. 4 is a flow chart of an example process 400 for routing network traffic using a switch interface board. In some implementations, one or more process blocks of FIG. 4 may be performed by network device 210. In some implementations, one or more process blocks of FIG. 4 may be performed by another device or a group of devices separate from or including network device 210.

As shown in FIG. 4, process 400 may include configuring switching elements for a particular operation mode (block 410). For example, network device 210 (e.g., a controller) may configure the switching elements (e.g., of a set of switch interface boards) for the particular operation mode. In some implementations, network device 210 may configure the switching elements based on information regarding a network. For example, network device 210 may detect a threshold level of network traffic and may determine to configure the switching elements for an operation mode to provide greater network capacity (e.g., to reconfigure from a standalone mode to a back-to-back mode). In some implementations, a network operator may use network device 210 to configure the switching elements. For example, based on adding a set of inter-chassis interconnects to the switching elements, the network operator may use a user interface of network device 210 to cause network device 210 to configure the switching elements.

In some implementations, network device 210 may configure the switching elements for the particular operation mode of a set of available modes. For example, network device 210 may configure the set of switching elements for a standalone mode to route network traffic between a first group of packet processing components of a chassis and a second group of packet processing components of the chassis. In this case, the chassis may house the first group of packet processing components, the second group of packet processing components, and the set of switching elements. Additionally, or alternatively, network device 210 may configure a first set of switching elements of a first chassis and a second set of switching elements of a second chassis for a back-to-back mode to route network traffic between a first group of packet processing components of the first chassis and a second group of packet processing components of the second chassis. Additionally, or alternatively, network device 210 may configure a first set of switching elements of a first chassis and one or more other sets of switching elements of one or more other chassis for a multi-chassis mode to route network traffic between a first group of packet processing components of the first chassis and one or more second groups of packet processing components of the one or more other chassis.

In some implementations, network device 210 may configure the switching elements after routing network traffic. For example, after routing network traffic in a first operation mode, network device 210 may reconfigure the switching elements for operation in a second operation mode. In this way, network device 210 may enable a network operator to dynamically adjust capacity of a network without replacing the switching elements installed for the network.

In some implementations, network device 210 may advertise a route to configure the switching elements for the particular operation mode. For example, network device 210 may cause a route to be advertised, such as using border gateway protocol (BGP) advertising or another protocol, to permit the switching elements to direct network traffic via a set of routes associated with the particular operation mode. For example, for the standalone mode, network device 210 may advertise a route associated with routing traffic between a first group of packet processing components of a chassis and a second group of packet processing components of the chassis via a set of switching elements of the chassis. Similarly, for the back-to-back mode, network device 210 may advertise a route associated with routing traffic between a first chassis and a second chassis. In this case, the switching elements may include the route in a routing table used to route network traffic received by the switching elements.

In some implementations, the switching elements may be wired to configure the switching elements. For example, a network operator may connect a set of wires to the switching elements to connect the switching elements (e.g., a set of local interconnections, a set of inter-chassis interconnections, etc.). In this case, network device 210 may configure the switching elements to use one or more of the set of wires to route network traffic (e.g., network device 210 may provide information to a first switching element indicating that a second switching element is connected to the first switching element via a particular port, SERDES, wire, etc. In this way, network device 210 permits the switching elements to dynamically change modes by changing which wires are used to communicate, rather than requiring switch interface boards to be removed and rewired.

In some implementations, network device 210 may configure a particular plane of switching elements for a particular operation mode. For example, when a chassis is associated with multiple routing planes (e.g., to increase capacity relative to a single plane, to provide redundancy, or the like), network device 210 may configure each plane for an operation mode (e.g., multiple different operation modes, a common operation mode, or the like).

In this way, network device 210 may configure the switching elements for the particular operation mode.

As further shown in FIG. 4, process 400 may include receiving network traffic for routing after configuring the switching elements (block 420). For example, network device 210 may receive network traffic for routing after configuring the switching elements. In some implementations, network traffic may be received at a packet processing component. For example, a first network device 210 may transmit network traffic to a second network device 210 for routing to a third network device 210. In this case, a first packet processing component (e.g., an ingress packet processing component) associated with the second network device 210 (e.g., a router that includes a first chassis and a second chassis operating in a back-to-back mode) may process the network traffic to perform encapsulation/de-encapsulation, forwarding table lookup, routing table lookup, Internet Protocol forwarding, etc., and may determine to provide the network traffic to a second packet processing component (e.g., an egress packet processing component) associated with the second network device 210 for routing to the third network device 210. In some implementations, the network traffic may be received by a group of packet processing components. For example, each chassis may include multiple groups of packet processing components (e.g., 2 groups, 3 groups, 4 groups, 8 groups, 16 groups, etc.), and may receive portions of network traffic at one or more packet processing components of each group of packet processing components (e.g., based on the network traffic being generated and transmitted by a network device 210) after configuring the switching elements.

In this way, network device 210 may receive network traffic for routing after configuring the switching elements.

As further shown in FIG. 4, process 400 may include routing the network traffic based on configuring the switching elements (block 430). For example, network device 210 may route the network traffic based on configuring the switching elements. In this case, the switching elements of a chassis (e.g., of a network device 210) may route the network traffic using one or more fabric interconnects, local interconnects, inter-chassis interconnects, or the like based on being configured in the particular operation mode. For example, a switching element may direct the network traffic via a particular route toward a packet processing component. In this way, a switch interface board including a switching element enables network traffic routing in one of a set of available modes without replacing the switch interface board to change a mode.

In this way, network device 210 may route the network traffic based on configuring the switching elements.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, a switching element (e.g., a switch interface board) of network device 210 enables multiple modes of operation for routing network traffic using the same switching element. Based on enabling multiple modes of operation, the switching element reduces a cost associated with expanding capacity of a network, a time to expand capacity of the network, or the like. Moreover, based on including a local interconnect, the switching element enables multiple groups of packet processing components to be incorporated into a single chassis and to communicate without each packet processing component of the multiple groups being connected to each switching element, thereby increasing capacity of the single chassis. Furthermore, based on including an inter-chassis interconnect, the switching element enables a back-to-back mode to increase capacity of the network relative to a single chassis without a cost and/or latency associated with a cross-connect chassis. Moreover, the switch interface board eliminates errors in switching modes (e.g., errors that may occur when an operator removes the wrong switch interface board, installs the wrong switch interface board, mis-configures cables of a chassis, or the like).

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with physical elements. However, implementations, described herein, may also operate using one or more virtualized elements or a combination of physical and virtualized elements. For example, implementations, described herein, may apply to virtualized networking elements implemented using one or more computing devices of a cloud computing environment, virtualized network elements implemented using one or more computing devices of a non-cloud based computing environment, or the like. Additionally, or alternatively, implementations, described herein, may be implemented using one or more applications, one or more virtual machines, virtualized storage, one or more hypervisors, or the like.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A switch interface board, comprising:
a first serializer/deserializer to communicate with a first group of packet processing components of a first chassis via a first port,
the first chassis housing the switch interface board and the first group of packet processing components;
a second serializer/deserializer to communicate with a second switch interface board of the first chassis via a second port,
the second switch interface board being connected to a second group of packet processing components of the first chassis,
the second group of packet processing components being different from the first group of packet processing components; and
a third port to communicate with at least one of:
a third switch interface board of a second chassis,
the second chassis being different from the first chassis, or
a switching device of a cross-connect chassis,
the switching device to direct network traffic between the first chassis and a set of other chassis,
the switch interface board to operate in a first mode to direct network traffic associated with the first group of packet processing components using one or more first wires,
the switch interface board dynamically changing modes to operate in a second mode to direct network traffic in a network associated with the first group of packet processing components to dynamically adjust a capacity of the network without replacing the second switch interface board or the third switch interface board and by using one or more second wires that are different than the one or more first wires, and
the switch interface board to advertise a route based on the second mode.

2. The switch interface board of claim 1, where the switch interface board is to operate in a standalone mode to direct network traffic between the first group of packet processing components and the second group of packet processing components via the second switch interface board.

3. The switch interface board of claim 1, where the switch interface board is to operate in a back-to-back mode to direct network traffic between the first group of packet processing components and a third group of packet processing components associated with the third switch interface board.

4. The switch interface board of claim 1, where the switch interface board is to operate in a multi-chassis mode to direct network traffic between the first group of packet processing components and the set of other chassis.

5. The switch interface board of claim 1, further comprising:
a first traffic routing plane to route network traffic; and
a second traffic routing plane to route network traffic.

6. The switch interface board of claim 1, where the switch interface board is a fabric line card of a switching fabric.

7. The switch interface board of claim 1, where the first chassis is a first network device and the second chassis is a second network device.

8. A network device, comprising:
a set of switching elements; and
one or more processors to:
configure the set of switching elements for a particular mode of a set of available modes,
the set of available modes including:
a standalone mode to route network traffic between a first group of packet processing components and a second group of packet processing components within a first chassis,
the first chassis housing the set of switching elements,
a back-to-back mode to route network traffic in a network between the first group of packet processing components of the first chassis and a third group of packet processing components of a second chassis,
the second chassis being different from the first chassis, or
a multi-chassis mode to route network traffic in the network between the first group of packet processing components of the first chassis and a cross-connect chassis,
the cross-connect chassis being different from the first chassis and the second chassis,
the cross-connect chassis being associated with directing network traffic in the network between the first chassis and a group of third chassis;
receive network traffic for routing after configuring the set of switching elements;
route the network traffic using one or more first wires based on configuring the set of switching elements;
dynamically reconfigure the set of switching elements for a different particular mode, of the set of available modes, to dynamically adjust a capacity of the network without replacing the set of switching elements in the network by using one or more second wires that are different than the one or more first wires; and
advertise a reconfigured route based on the reconfigured set of switching elements for the different particular mode.

9. The network device of claim 8, where the one or more processors are further to:
receive an instruction to configure the set of switching elements for the particular mode; and
where the one or more processors, when configuring the set of switching elements for the particular mode, are to:
configure the set of switching elements based on receiving the instruction.

10. The network device of claim 8, where the one or more processors are further to:
receive, after routing the network traffic, an instruction to reconfigure the set of switching elements;
configure, based on the instruction, the set of switching elements for another mode of the set of available modes; and route subsequent network traffic based on configuring the set of switching elements for the other mode of the set of available modes.

11. The network device of claim 8, where the one or more processors, when routing the network traffic, are to:
direct the network traffic from a first packet processing component of the first group of packet processing components to a first serializer/deserializer of a first switching element of the set of switching elements;
direct the network traffic via a local interconnect from a second serializer/deserializer of the first switching element to a third serializer/deserializer of a second switching element of the set of switching elements; and
direct the network traffic from a fourth serializer/deserializer of the second switching element to a second packet processing component of the second group of packet processing components.

12. The network device of claim 8, where the one or more processors, when routing the network traffic, are to:
direct the network traffic from a first packet processing component of the first group of packet processing components to a first serializer/deserializer of a first switching element of the set of switching elements; and
direct the network traffic via an inter-chassis interconnect to another switching element of the second chassis,
the other switching element being connected to the third group of packet processing components.

13. The network device of claim 8, where the one or more processors, when routing the network traffic, are to:
direct the network traffic from a first packet processing component of the first group of packet processing components to a first serializer/deserializer of a first switching element of the set of switching elements; and
direct the network traffic via an inter-chassis interconnect to a switching device of the cross-connect chassis,
the switching device being connected to the group of third chassis.

14. The network device of claim 8, where the set of switching elements is a first set of switching elements associated with a first plane of the first chassis and the particular mode is a first mode; and
where the one or more processors are further to:
configure a second set of switching elements associated with a second plane of the first chassis for a second mode of the set of available modes.

15. A method, comprising:
configuring, by a device, a set of switching elements of a particular plane of a first chassis for a particular mode of a set of available modes,
the set of available modes including at least two of:
a first mode to route network traffic between a first group of packet processing components and a second group of packet processing components within the first chassis,
the first chassis housing the set of switching elements,
a second mode to route network traffic in a network between the first group of packet processing components of the first chassis and a third group of packet processing components of a second chassis,
the second chassis being different from the first chassis, or
a third mode to route network traffic in the network between the first group of packet processing components of the first chassis and a cross-connect chassis,
the cross-connect chassis being different from the first chassis and the second chassis,
the cross-connect chassis being associated with directing network traffic in the network between the first chassis and a group of third chassis;
receiving, by the device, network traffic for routing after configuring the set of switching elements;
routing, by the device, the network traffic using one or more first wires based on configuring the set of switching elements;
dynamically reconfiguring, by the device, the set of switching elements for a different particular mode, of the set of available modes, to dynamically adjust a capacity of the network without replacing the set of switching elements in the network by using one or more second wires that are different than the one or more first wires; and
advertise a reconfigured route based on the reconfigured set of switching elements for the different particular mode.

16. The method of claim 15, further comprising:
receiving an instruction to configure the set of switching elements for the particular mode; and
where configuring the set of switching elements for the particular mode comprises:
configuring the set of switching elements based on receiving the instruction.

17. The method of claim 15, further comprising:
receiving, after routing the network traffic, an instruction to reconfigure the set of switching elements;
configuring, based on the instruction, the set of switching elements for another mode of the set of available modes; and
routing subsequent network traffic based on configuring the set of switching elements for the other mode of the set of available modes.

18. The method of claim 15, where routing the network traffic comprises:
directing the network traffic from a first packet processing component of the first group of packet processing components to a first serializer/deserializer of a first switching element of the set of switching elements; and
directing the network traffic via a local interconnect from a second serializer/deserializer of the first switching element to a third serializer/deserializer of a second switching element of the set of switching elements; and
directing the network traffic from a fourth serializer/deserializer of the second switching element to a second packet processing component of the second group of packet processing components.

19. The method of claim 15, where routing the network traffic comprises:
directing the network traffic from a first packet processing component of the first group of packet processing components to a first serializer/deserializer of a first switching element of the set of switching elements; and
directing the network traffic via an inter-chassis interconnect to another switching element of the second chassis,
the other switching element being connected to the third group of packet processing components.

20. The method of claim 15, where routing the network traffic comprises:
directing the network traffic from a first packet processing component of the first group of packet processing components to a first serializer/deserializer of a first switching element of the set of switching elements; and directing the network traffic via an inter-chassis interconnect to a switching device of the cross-connect chassis, the switching device being connected to the group of third chassis.

\* \* \* \* \*